UNITED STATES PATENT OFFICE.

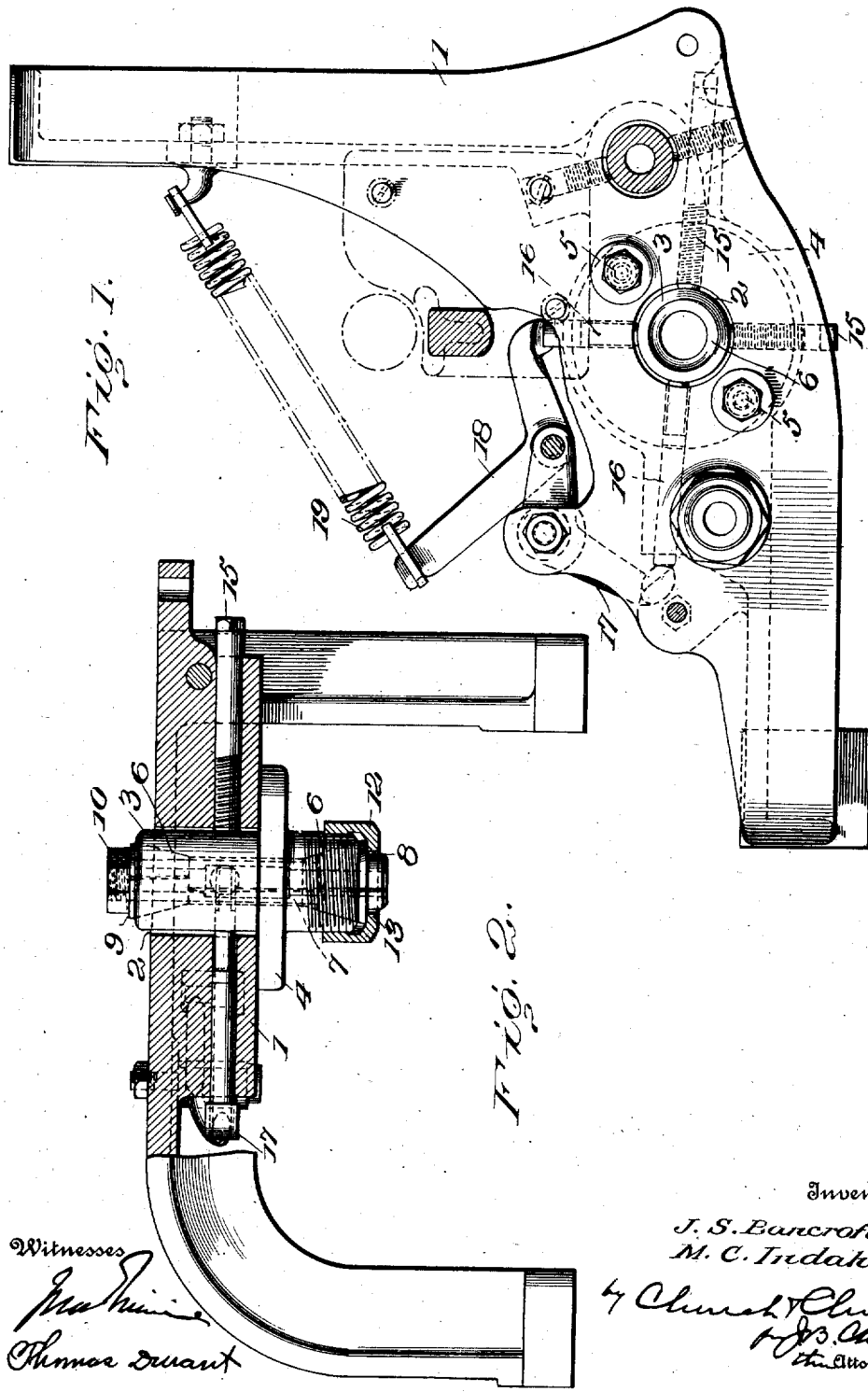
J. S. BANCROFT & M. C. INDAHL.
CENTERING PIN ADJUSTMENT FOR TYPE CASTING MACHINES.
APPLICATION FILED NOV. 15, 1910.
989,556.　　　　　　　　　　　　Patented Apr. 18, 1911.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

CENTERING-PIN ADJUSTMENT FOR TYPE-CASTING MACHINES.

989,556.  Specification of Letters Patent.  Patented Apr. 18, 1911.

Application filed November 15, 1910. Serial No. 592,484.

*To all whom it may concern:*

Be it known that we, JOHN SELLERS BANCROFT and MAURITZ C. INDAHL, citizens of the United States, residing at Philadelphia, in the county of Philadelphia and State of Pennsylvania, have invented certain new and useful Improvements in Centering-Pin Adjustments for Type-Casting Machines; and we do hereby declare the following to be a full, clear, and exact description of the same, reference being had to the accompanying drawings, forming a part of this specification, and to the figures and letters of reference marked thereon.

This invention relates to the class of type casting machines in which the members of a movable series of matrices are selectively and successively presented opposite a mold and finally centered and seated thereon by a reciprocatory centering pin, the latter supported in fixed lateral relation to the mold and provided with a conical centering point adapted to enter and seat within the centering cavity of the selected matrix, and it has for its object to provide a more ready, expeditious and efficient means for effecting the initial adjustment of the centering pin in its relation to the mold.

The invention is designed as an improvement upon the centering mechanism of Patent No. 625,998 of May 30, 1899, and resides in the construction, combination and arrangement of parts hereinafter fully described, the novel features whereof are specified in the claims.

In the accompanying drawings illustrating a preferred form of embodiment of the invention—Figure 1 is a top plan view of the centering pin frame or bridge and its bearing or hub, with the improved adjusting mechanism applied thereto. Fig. 2 is a vertical section.

Like numerals designate corresponding parts in the several figures.

As is the case in the prior patented machine, the frame or bridge 1 is provided with an opening 2 for the reception of a cylindrical hub 3, the latter equipped with a flange 4 engaging the faced under surface of the bridge and clamped in position thereon by bolts 5 extending through the bridge and threaded into said flange. The openings for the hub and its clamping bolts are enlarged to permit a limited degree of lateral displacement of said hub, for purposes of adjustment, and the hub is bored centrally and provided at each end with reversed conical bearings 6 to receive a split bushing 7 forming the bearing for the centering pin, said bushing being provided with a conical head 8 at one end and a split conical sleeve 9 and adjusting nut 10 at its opposite end. Inasmuch as the relation which the face bears to the body of the produced type is dependent upon the position which the axis of the centering pin bears to the mold cavity it is obviously of prime importance that the initial adjustment of the hub containing the bearing for the centering pin shall be accurately performed. The means heretofore supplied for this purpose consisted of four screws threaded through the walls of opening 2 and converging therein upon the periphery of the hub. In adjusting the hub to final position it was necessary to retract one or both of the screws on the side toward which movement was desired and then advance the screw or screws on the opposite side, or to retract the four screws, set the hub to position, and then clamp it by advancing the screws into contact therewith. The means heretofore supplied for effecting the lateral adjustment of the hub within opening 2 consisted of four screws threaded through the walls of said opening and converging therein at angles of 90°. The inner ends of all the screws impinged upon the periphery of the hub and when adjusting the latter to final position it was necessary to retract one or more of the screws before the screw on the other side could be advanced to shift the hub. Thus in most instances all four screws had to be manipulated one or more times. In most instances it was necessary to manipulate all four screws before the desired adjustment was attained, and even so one or more trial adjustments were usually required, as the setting up of the screws was liable to produce a slight displacement demanding subsequent correction, and in so doing it not infrequently happened that excessive pressure was brought to bear upon the hub occasioning more or less distortion of the latter and interfering with the correct seating of the contained bushing constituting the bearing for the centering pin. Moreover, there was manifested a tendency on the part of the bushing to contract unequally at opposite ends under the action of nut 10, due to the fact that the latter took its bearing directly upon sleeve 9 and was required to overcome the frictional resistance of the contacting surfaces in moving head 8 upon its bearing. The result was that head 8 would not enter its bearing to the same extent as did sleeve 9, in consequence whereof the bearing for the centering pin would be larger at one end, thereby permitting slight lateral displacement of the centering pin and a corresponding degree of departure from its accurate position when performing its centering functions.

The present improvements are designed to remove the defects and supply the omissions indicated above. According to the present invention, the end of the hub near head 8 of bushing 7 is threaded to receive a sleeve or nut 12, the latter provided with a flange 13 over-lapping the end of the bushing, said sleeve supplementing the action of nut 10 by applying pressure directly to head 8 for closing the lower end of the bushing into working engagement with the inserted centering pin. Two of the adjusting screws 15 of the prior structure are retained and the other two are replaced by movable pins 16, each opposing one of the screws and extending radially through the wall of opening 2. Pivotally mounted upon the bridge is a lever 17 one arm whereof engages the outer end of one of said pins 16, and to the other or power arm of said lever is pivoted a second lever 18, one arm whereof engages the outer end of the other pin 16. To the other or power arm of lever 18 is connected a spring 19 whose opposite end is detachably secured to the bridge. Spring 19 operates upon levers 17 and 18 to project pins 16 inward toward the hub, clamping and holding the latter upon the adjusting screws 15 and causing it to follow the latter in their advancing and retracting movements. The spring 19 is tensioned to project pins 16 with sufficient power to afford lateral support to the hub but less in amount than is required to deform the latter.

It is apparent that the clamping or holding action of the adjusting devices is practically uniform in all positions of adjustment of the hub, and further that lateral displacement of the hub in any direction radial of its axis can be directly performed by the manipulation of either or both screws 15, thereby eliminating the setting up of the screws heretofore required, and preventing deformation of the hub by excessive pressure.

Having thus described our invention, what we claim as new and desire to secure by Letters Patent of the United States is:—

1. In a type casting machine, such as described, and in combination with the centering pin thereof a bearing block or hub provided with reversed conical seats, a split bushing provided with a conical head at one end, a split conical collar and nut at the opposite end, and a nut threaded upon the bearing block or hub and engaging the headed end of said bushing.

2. In a type casting machine and in combination with the centering pin bearing or hub and its supporting frame or bridge, two positively acting adjusting members mounted upon the frame and radially disposed on intersecting lines relatively to the hub, a yielding follower opposite each adjusting member, and means for clamping the hub in adjusted position upon the frame.

3. In a type casting machine provided with a laterally movable centering pin hub and a supporting frame or bridge therefor and in combination therewith a hub adjusting means including two set screws disposed upon converging planes within the hub-opening in the frame, two radially movable members or pins each opposed to one of said screws, and yieldable pressure devices for advancing each radially movable member toward the opposed adjusting screw, said movable members and screws converging and impinging upon the periphery of the centering pin hub.

4. In a type casting machine provided with a laterally movable centering pin bearing or hub located within an opening in the supporting frame or bridge, and in combination therewith two set screws in angular relation extending through the walls of said opening and engaging the periphery of the hub therein, a movable member or pin engaging the side of the hub opposite each adjusting screw, a lever mounted on the frame and engaging one of said movable members or pins, a second lever mounted on the first named lever and engaging the other movable member or pin, and a spring connected to and actuating the last named lever.

5. In a type casting machine provided with a supporting frame or bridge and a centering pin bearing or hub laterally movable within an opening therein, and in combination therewith, two angularly disposed adjusting screws engaging the hub on two sides, two movable hub engaging pins each opposed to one of said screws, a lever mounted upon the frame and engaging one of said pins, a lever mounted upon the power arm of the first named lever and engaging the second of said pins, and a spring engaging the power arm of said last named lever.

6. In a type casting machine, and in combination with the recessed supporting frame or bridge and the centering pin bearing or hub extending into said recess and movable laterally therein, two adjusting screws projecting radially of the recess and engaging the periphery of the hub, a radially movable pin in the wall of the recess opposite each screw, two levers fulcrumed one on the other and the latter on the frame, and a spring interposed between one of said levers and the frame and operating to hold the pins in contact with the hub in all positions of adjustment of the screws.

JOHN SELLERS BANCROFT.
MAURITZ C. INDAHL.

Witnesses:
MORTIMER A. JONES,
FRED WEINDEL, Jr.